(12) United States Patent
Aizaki (10) Patent No.: US 12,510,760 B2
(45) Date of Patent: Dec. 30, 2025

(54) HEAD-MOUNTED DISPLAY

(71) Applicant: JVCKENWOOD Corporation, Yokohama (JP)

(72) Inventor: Takatsugu Aizaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 347 days.

(21) Appl. No.: 18/196,552

(22) Filed: May 12, 2023

(65) Prior Publication Data

US 2023/0384607 A1    Nov. 30, 2023

(30) Foreign Application Priority Data

May 31, 2022    (JP) ................................. 2022-088545

(51) Int. Cl.
*G02B 27/14* (2006.01)
*G02B 27/01* (2006.01)

(52) U.S. Cl.
CPC ......... *G02B 27/142* (2013.01); *G02B 27/017* (2013.01)

(58) Field of Classification Search
CPC .... G02B 2027/0178; G02B 2027/0138; G02B 27/017; G02B 27/10; G02B 6/3516; G02B 23/125; G02B 27/283; G02B 27/01; G02B 27/142; G02B 27/1006; G06F 3/013; G06F 1/163

See application file for complete search history.

(56) References Cited

U.S. PATENT DOCUMENTS

2019/0317320 A1 * 10/2019 Park ..................... G02B 27/144

FOREIGN PATENT DOCUMENTS

JP      2020079829 A    5/2020
WO    WO 2018217951    * 5/2018    ............. A61B 90/20

* cited by examiner

*Primary Examiner* — Brandi N Thomas
(74) *Attorney, Agent, or Firm* — Procopio, Cory, Hargreaves & Savitch LLP (57) ABSTRACT

A head-mounted display according to the present embodiment includes a reflective member arranged in front of a user and configured to reflect at least part of display light for forming a display image toward the user, and a beam splitter arranged between the reflective member and an eye of the user and configured to reflect the display light toward the reflective member and to transmit the display light that has been reflected by the reflective member, in which transmittance of the beam splitter in a direction from a first position above the eye of the user toward the eye is equal to transmittance of the beam splitter in a direction from a second position below the eye of the user toward the eye.

4 Claims, 10 Drawing Sheets

HEAD-MOUNTED DISPLAY

CROSS REFERENCE TO RELATED APPLICATION

This application is based upon and claims the benefit of priority from Japanese patent application No. 2022-088545, filed on May 31, 2022, the disclosure of which is incorporated herein in its entirety by reference.

BACKGROUND

This disclosure relates to a head-mounted display.

Japanese Unexamined Patent Application Publication No. 2020-79829 discloses a head-mounted display including a display element, a beam splitter, and a combiner. The beam splitter and the combiner are half mirrors to form a virtual image in front of a user. The combiner is a concave mirror arranged in front of the beam splitter.

SUMMARY

Figure 10:
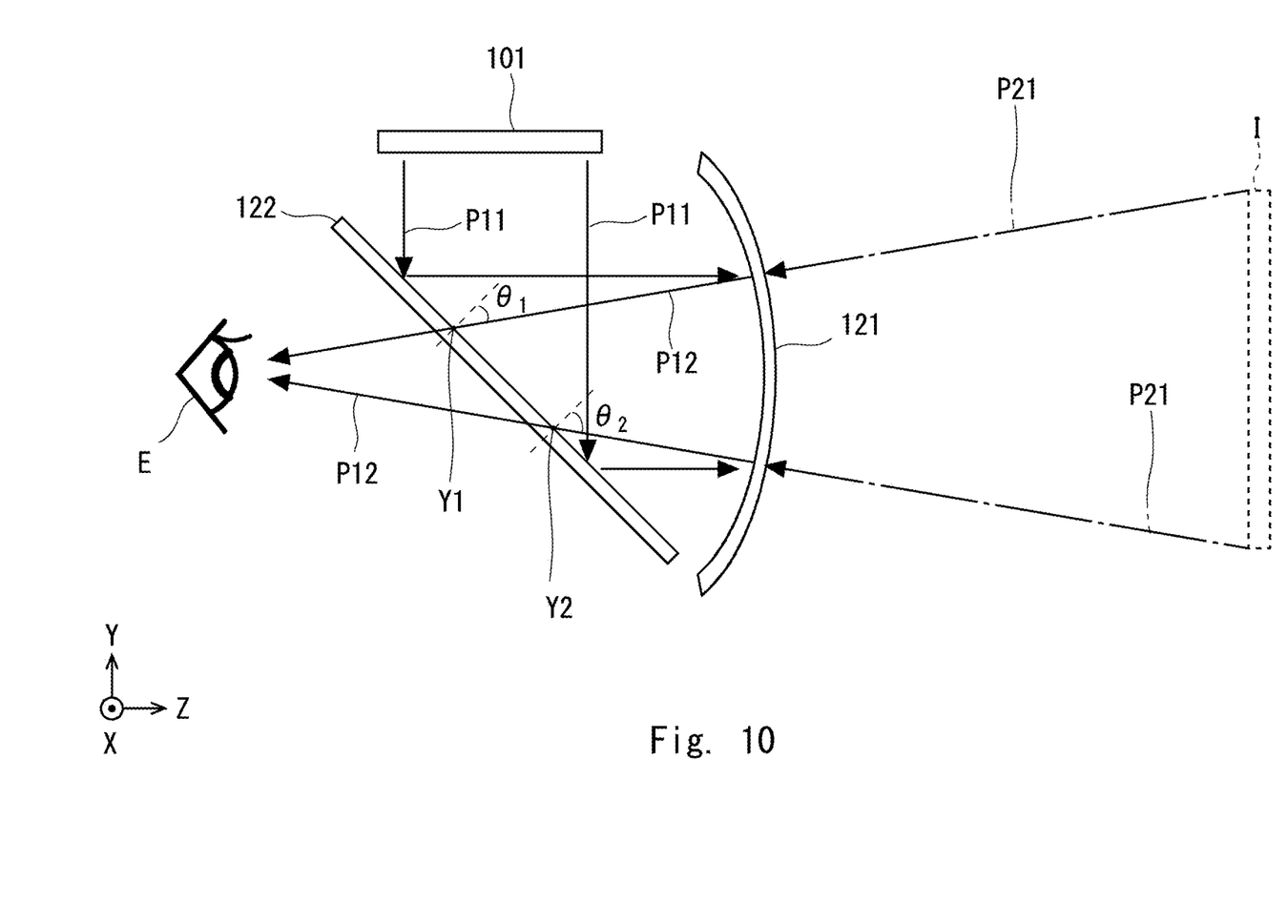
FIG. 10 is a view for describing an incident angle corresponding to an incident position of a beam splitter.

The incident angle of light to a beam splitter changes according to the position of the beam splitter. Therefore, a luminance difference can appear in a display image in the vertical direction. This point is explained with reference to FIG. 10. FIG. 10 is a diagram schematically showing an optical system of a head-mounted display.

A display element unit 101 is arranged above a beam splitter 122. The beam splitter 122 reflects display light P11 from the display element unit 101 forward. The display light P11 reflected by the beam splitter 122 enters a combiner 121. The combiner 121 reflects the display light P11 backward. The display light reflected backward by the combiner 121 is referred to as display light P12. The display light P12 passes through the beam splitter 122 and enters an eye E of a user. Thus, the user is able to see a virtual image I of a display image in the front.

The combiner 121 is a concave half-mirror. The combiner 121 transmits outside light P21 from in front of the combiner 121. The outside light P21 and the display light P12 pass through the beam splitter 122 and enter the eye E of the user. The user is able to see a superimposed image in which the display image is superimposed on a view in the front.

The beam splitter 122 is a planar half-mirror. The reflectance of the beam splitter 122 changes according to the incident angle of light to the plane. The incident angle of light to the beam splitter 122 changes according to the vertical position.

For example, in the beam splitter 122, a position above the eye E is referred to as a first position Y1, and a position below the eye E is referred to as a second position Y2. The incident angle of light at the first position Y1 is referred to as an incident angle θ1, and the incident angle of light at the second position Y2 is referred to as an incident angle θ2. Each of the incident angle θ1 and the incident angle θ2 is the angle formed between the normal to the plane of the beam splitter 122 and the traveling direction of light toward the eye E.

The incident angle θ1 is smaller than the incident angle θ2. Therefore, the transmittance at the first position Y1 is larger than the transmittance at the second position Y2. Therefore, the upper side of the virtual image I that the user sees becomes brighter, and the lower side becomes darker. Since a luminance difference is generated between the upper side and lower side of the virtual image I, the display quality can deteriorate.

A head-mounted display according to the present embodiment includes a reflective member arranged in front of a user and configured to reflect at least part of display light for forming a display image toward the user, and a beam splitter arranged between the reflective member and an eye of the user and configured to reflect the display light toward the reflective member and to transmit the display light that has been reflected by the reflective member, in which transmittance of the beam splitter in a direction from a first position above the eye of the user toward the eye is equal to transmittance of the beam splitter in a direction from a second position below the eye of the user toward the eye.

According to the present disclosure, it is possible to provide a head-mounted display with high display quality.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Specific embodiments of the present disclosure are described hereinafter in detail with reference to the drawings. The present disclosure, however, is not limited to the below-descried embodiments. The following description and the attached drawings are appropriately simplified to clarify the explanation.

First Embodiment

Figure 1:
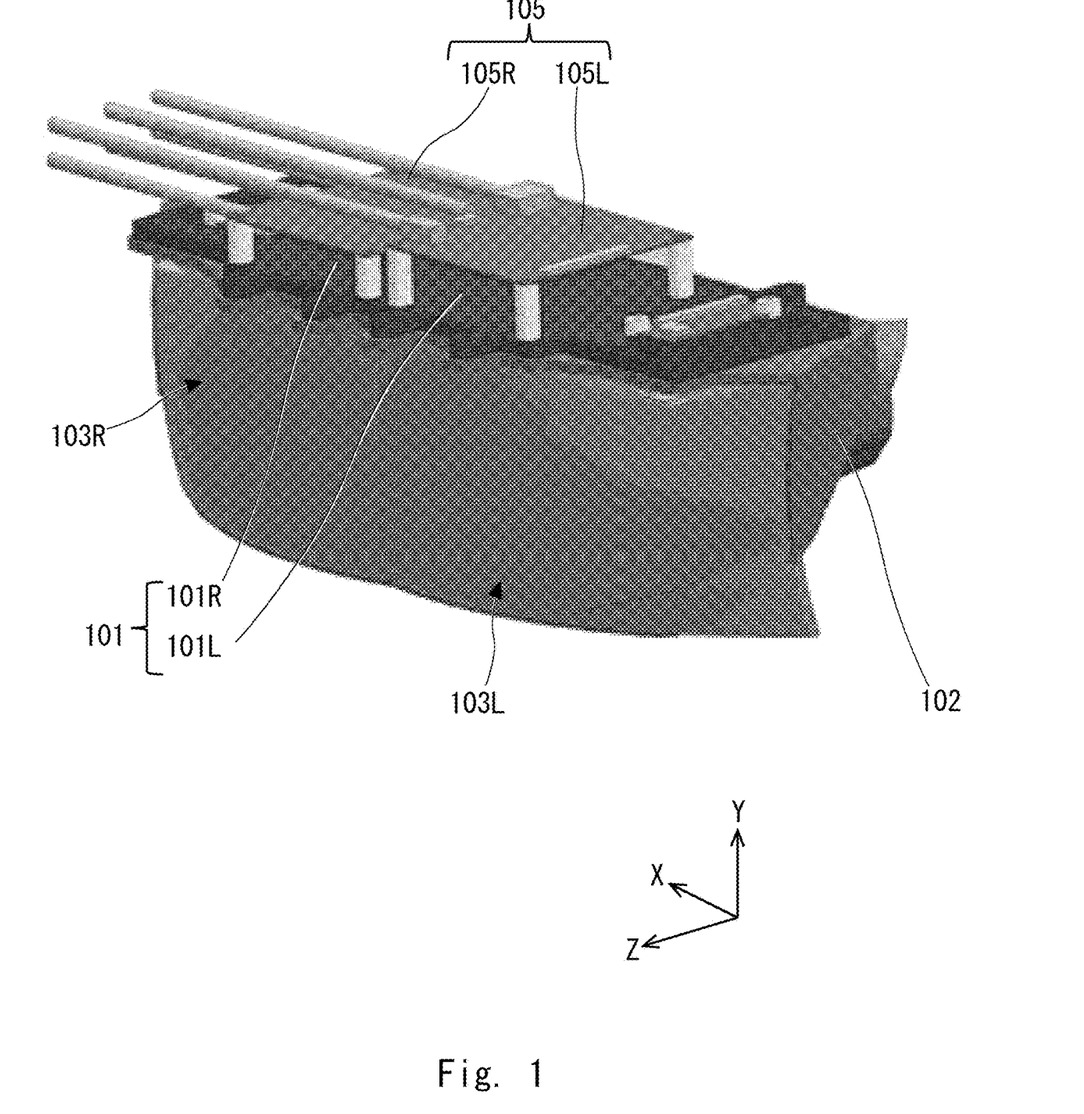
FIG. 1 is a view showing a part of the structure of a head-mounted display according to the present embodiment.
Figure 2:
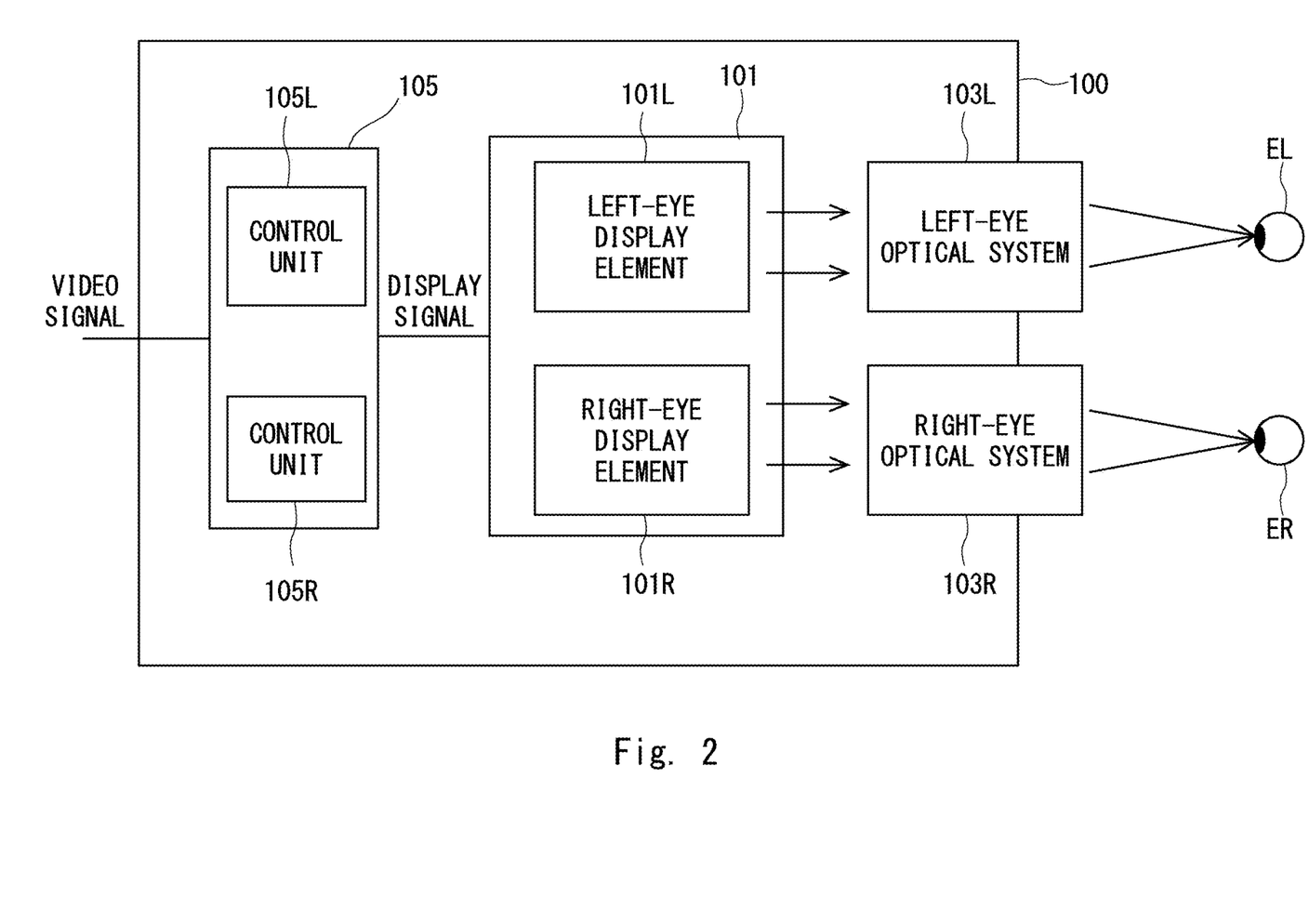
FIG. 2 is a view showing functional blocks of the head-mounted display according to the present embodiment.

A head-mounted display and a display method of the same according to an embodiment are described hereinafter with reference to the drawings. FIG. 1 is a perspective view schematically showing a part of a structure of a head-mounted display 100. FIG. 2 is a view showing some of functional blocks of the head-mounted display 100. FIGS. 1 and 2 mainly show a structure related to image display of the head-mounted display 100. FIG. 1 shows the internal structure of the head-mounted display 100, and the elements shown in FIG. 1 may be covered with a cover or the like in practice.

The head-mounted display 100 is applicable to various purposes, such as game, entertainment, industrial, medical, and flight simulation purposes. The head-mounted display 100 may be a virtual reality (VR) head-mounted display, an augmented reality (AR) head-mounted display, or an mixed reality (MR) head-mounted display, for example. Note that the head-mounted display 100 is an optical see-through head-mounted display used for AR or MR in the present embodiment, but may be a non-transmissive head-mounted display.

To clarify the explanation, an XYZ three-dimensional Cartesian coordinate system is used in the following description. As seen from a user, the front-back direction (depth direction) is a Z direction, the left-right direction (horizontal direction) is an X direction, and the up-down direction (vertical direction) is a Y direction. The front direction is a +Z direction, the back direction is a −Z direction, the right direction is a +X direction, the left direction is a −X direction, the up direction is a +Y direction, and the down direction is a −Y direction.

The user, which is not shown, is wearing the head-mounted display 100. The head-mounted display 100 includes a display element unit 101, a frame 102, a left-eye optical system 103L, a right-eye optical system 103R, and a control unit 105. The control unit 105 includes a control unit 105L and a control unit 105R.

The frame 102 has a goggle or eyeglass shape and is worn on the head of the user with a head band, which is not shown, or the like. The display element unit 101, the left-eye optical system 103L, the right-eye optical system 103R, the control unit 105L, and the control unit 105R are mounted on the frame 102. Note that, although the binocular head-mounted display 100 is shown in FIG. 1, the head-mounted display may be a glasses-shaped non-immersive head-mounted display.

The display element unit 101 includes a left-eye display element 101L and a right-eye display element 101R. The left-eye display element 101L generates a display image for a left eye. The right-eye display element 101R generates a display image for a right eye. Each of the left-eye display element 101L and the right-eye display element 101R includes a flat-panel display element, such as a liquid crystal element or an organic electro-luminescence (EL) element. The left-eye display element 101L and the right-eye display element 101R may be curve-shaped displays. Each of the left-eye display element 101L and the right-eye display element 101R includes a plurality of pixels arranged in an array. The array arrangement is not limited to two-dimensional matrix arrangement and may be PenTile arrangement or the like. The left-eye display element 101L is arranged on the left side (−X side) of the right-eye display element 101R.

The control unit 105 is provided above the display element unit 101 (on the +Y side). The control unit 105 is supplied with a video signal, a control signal, and power from the outside. For example, a video signal and the like are input to the control unit 105 by wired connection, such as HDMI (registered trademark), or wireless connection, such as Wi-Fi (registered trademark) or BlueTooth (registered trademark). The head-mounted display 100 may include a video generation unit (not shown) that generates a video signal, and a video signal or the like generated by the video generation unit may be input to the control unit 105.

The control unit 105L and the control unit 105R include hardware resources, such as a central processing unit (CPU) and a memory, and operates according to a computer program stored in the memory. Each of the control unit 105L and the control unit 105R further includes a display driving circuit and the like. The control unit 105L generates a display signal of a left-eye image on the basis of a video signal, a control signal, and the like and outputs it to the left-eye display element 101L. The left-eye display element 101L thereby outputs display light for displaying the left-eye image. The control unit 105R generates a display signal of a right-eye image on the basis of a video signal, a control signal and the like and outputs it to the right-eye display element 101R. The right-eye display element 101R thereby outputs display light for displaying the right-eye image. In this manner, the control unit 105 outputs display signals to the display element unit 101.

Note that the display element unit 101 does not necessarily have the structure in which the left-eye display element 101L and the right-eye display element 101R are separate display elements and may have a single display element. The single display element may generate a display image for a left eye and a display image for a right eye. In this case, the display element unit 101 generates a left-eye image by using a part on one side of the display area of the display and generates a right-eye image by using a part on the other side of the display area of the display.

Some or all of the display element unit 101, the control unit 105, and the like are not necessarily fixed to the frame 102 and may be detachably mounted on the frame 102. For example, the display element unit 101, the control unit 105, and the like may be implemented by mounting a smartphone or a tablet computer on the frame 102. In this case, an application program (app) that generates display images for the head-mounted display is previously installed in the smartphone or the like.

The left-eye optical system 103L guides the display light output from the left-eye display element 101L to a left eye EL of the user as a left-eye image. The right-eye optical system 103R guides the display light output from the right-eye display element 101R to a right eye ER of the user as a right-eye image. The left-eye optical system 103L is arranged on the left side (−X side) of the right-eye optical system 103R. The left-eye optical system 103L is arranged in front of the left eye EL of the user (in the +Z direction). The right-eye optical system 103R is arranged in front of the right eye ER of the user (in the +Z direction). The user is able to see a virtual image of a display image generated by the display element unit 101 in the front (in the +Z direction).

As described above, the head-mounted display 100 according to the present embodiment may be either a semi-transmissive or non-transmissive head-mounted display. Note that the description herein is provided assuming that the head-mounted display 100 is a semi-transmissive head-mounted display. Thus, the left-eye optical system 103L and the right-eye optical system 103R each include a combiner, which is described later. In the semi-transmissive head-mounted display 100, display light from the display element unit 101 and outside light enter the left eye EL and the right eye ER. Thus, the user is able to see a superimposed image in which a display image is superimposed on a view in the front (in the +Z direction).

Figure 3:
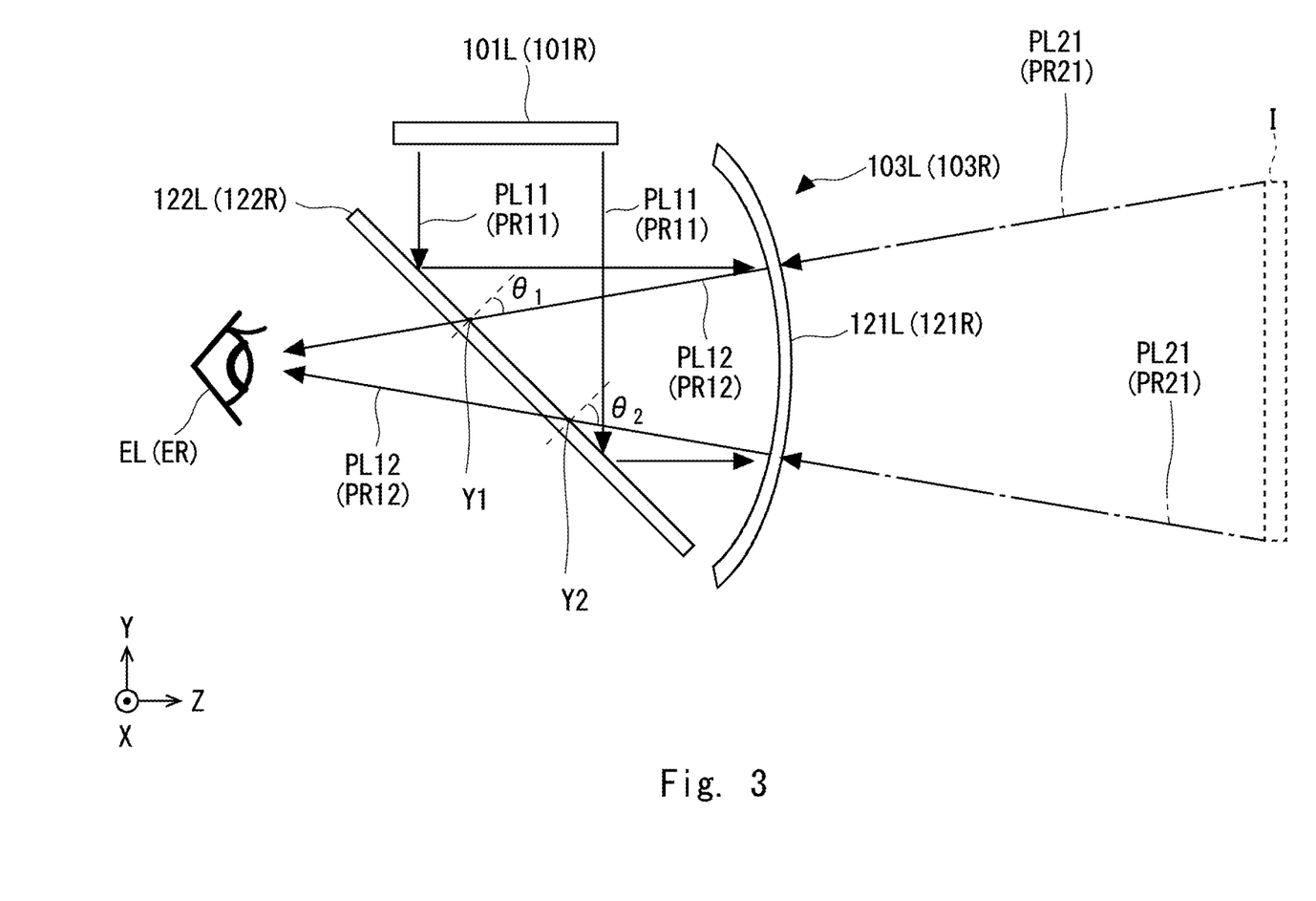
FIG. 3 is a view for describing an optical system of a head-mounted display.

An example of the left-eye optical system 103L and the right-eye optical system 103R (which are collectively referred to simply as an optical system below) is described hereinafter. FIG. 3 is a side view schematically showing the optical system. Note that the left-eye optical system 103L and the right-eye optical system 103R have the same structure, and therefore the left-eye optical system 103L is only described in FIG. 3.

The left-eye optical system 103L includes a combiner 121L and a beam splitter 122L. The combiner 121L and the beam splitter 122L are fixed to the frame 102 shown in FIG. 1.

The combiner 121L is a concave mirror, and the beam splitter 122L is a plane mirror. The combiner 121L and the beam splitter 122L are beam splitters, such as half-mirrors, and reflect part of incident light and transmit part of incident light. When it is assumed that the percentage of reflection and the percentage of transmission in the combiner 121L are equal, the combiner 121L transmits approximately half of the amount of incident light and reflects the remaining half. Likewise, when it is assumed that the percentage of reflection and the percentage of transmission in the beam splitter 122L are equal, the beam splitter 122L transmits approximately half of the amount of incident light and reflects the remaining half. The combiner 121L and the beam splitter 122L may increase the percentage of reflection and decrease the percentage of transmission or may decrease the percentage of reflection and increase the percentage of transmission.

The combiner 121L and the beam splitter 122L are arranged in front of the left eye EL of the user (in the +Z direction). In addition, the combiner 121L is arranged in front of the beam splitter 122L (in the +Z direction).

The left-eye display element 101L is arranged above the beam splitter 122L (in the +Y direction). The left-eye display element 101L outputs display light PL11 for forming a display image. Thus, the left-eye display element 101L is arranged diagonally above the front of the left eye EL.

The display light PL11 from the left-eye display element 101L is described hereinafter. The display surface of the left-eye display element 101L faces downward (in the −Y direction). Thus, the display light PL11 from the left-eye display element 101L is output downward (in the −Y direction). The beam splitter 122L is arranged at an angle below the left-eye display element 101L (in the −Y direction). The display light PL11 from the left-eye display element 101L enters the beam splitter 122L. The beam splitter 122L reflects part of the display light PL11.

Note that a light shielding part may be provided below the beam splitter 122L. The light shielding part blocks the remaining part of the display light PL11 that has passed through the beam splitter 122L. This allows the display light that has passed through the beam splitter 122L to be blocked, thereby preventing the lower side from becoming brighter than the beam splitter 122L.

The beam splitter 122L reflects the display light PL11 from the left-eye display element 101L forward (in the +Z direction). Then, the display light PL11 enters the combiner 121L. The combiner 121L reflects part of the display light PL11 backward (in the −Z direction). The display light PL11 that has been reflected by the combiner 121L is referred to as display light PL12. Furthermore, the combiner 121L is a concave mirror and reflects the display light PL11 so as to focus the display light PL12 toward the left eye EL. The display light PL12 that has been reflected by the combiner 121L enters the beam splitter 122L. The beam splitter 122L transmits part of the display light PL12.

The display light PL12 that has passed through the beam splitter 122L enters the left eye EL. In this manner, the left-eye optical system 103L guides the display light PL11 from the left-eye display element 101L to the left eye EL of the user. The optical system can display a virtual image I in front of the user (in the +Z direction). Furthermore, since a concave mirror is used as the combiner 121L, the display image is displayed in a larger scale.

Next, outside light PL21 from the front of the user (+Z direction) is described hereinafter. Part of the outside light PL21 passes through the combiner 121L. The outside light PL21 that has passed through the combiner 121L enters the beam splitter 122L. The beam splitter 122L transmits part of the outside light PL21. The outside light PL21 that has passed through the beam splitter 122L enters the left eye EL.

Since the head-mounted display 100 is semi-transmissive, the combiner 121L combines the outside light PL21 from the front (+Z direction) and the display light PL11 from the left-eye display element 101L. The right-eye optical system 103R is the same as the left-eye optical system 103L. The combiner 121R combines outside light PR21 from the front (+Z direction) and display light PR11 from the right-eye display element 101R. By arranging the combiners 121L and 121R in front of the user (in the +Z direction), the head-mounted display 100 functions as an optical see-through display. A display image is superimposed on a view in front of the user (in the +Z direction). The user is thereby able to see a view in which the display image is superimposed.

The beam splitter 122L is inclined from the Z direction. In other words, the surface of the beam splitter 122 is inclined from the XY plane. The incident angle of the display light PR12 changes according to the vertical position (Y position) of the beam splitter 122L. In FIG. 3, the inclination angle of the beam splitter 122L with respect to the Z direction is 45°.

For example, in the beam splitter 122L, a position above the left eye EL is referred to as a first position Y1, and a position below the left eye EL is referred to as a second position Y2. The incident angle of light at the first position Y1 is an incident angle θ1, and the incident angle of light at the second position Y2 is an incident angle θ2. The incident angle θ1 and the incident angle θ2 are the angles formed by the normal to the plane of the beam splitter 122 and the traveling direction of light. Here, the light defining the incident angles θ1 and θ2 can be the display light PL12 that has been reflected by the combiner 121L and directed toward the left eye EL or the outside light PL21 that has passed through the combiner 121L and has been directed toward the left eye EL.

As shown in FIG. 3, the beam splitter 122L is inclined in such a manner that the lower side (−Y side) is positioned further forward (+Z side). Therefore, the incident angle θ1 is smaller than the incident angle θ2. For example, the beam splitter 122L has higher transmittance as the incident angle decreases. For this reason, the upper side of the beam splitter 122L becomes brighter and the lower side becomes darker, which can cause a luminance difference of the virtual image I.

Figure 4:
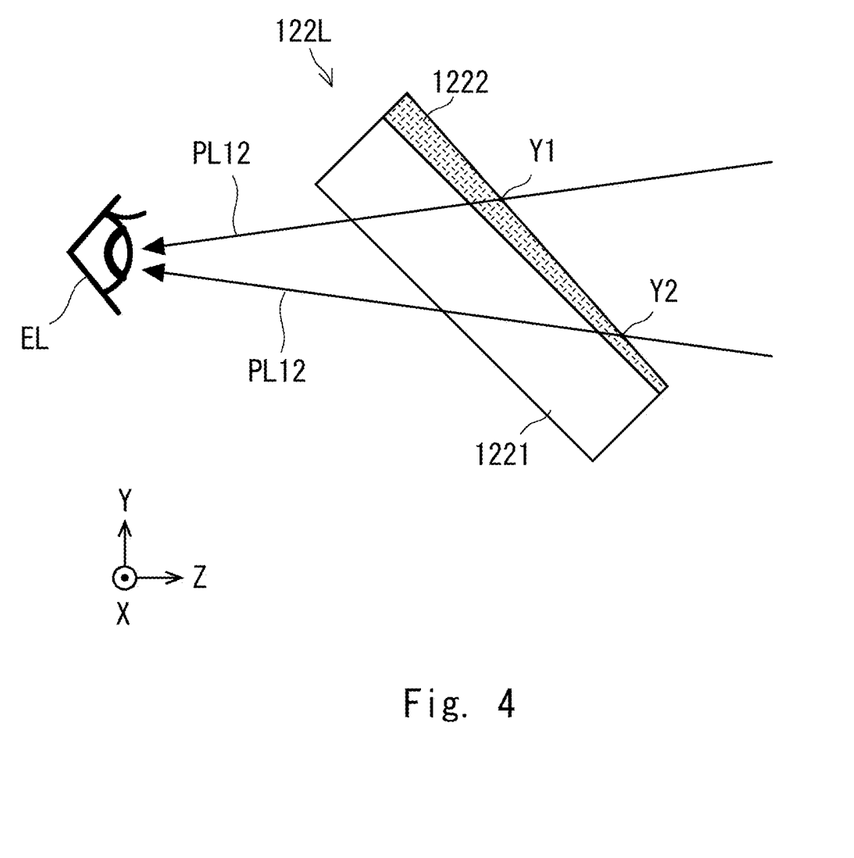
FIG. 4 is a view schematically showing the structure of a beam splitter of a head-mounted display according to a first embodiment.

Therefore, the spatial distribution of the transmittance of the beam splitter 122L is adjusted in order to reduce the luminance difference of a virtual image caused by the difference in the incident angle. The detailed structure of the beam splitter 122L is described hereinafter with reference to FIG. 4. FIG. 4 is a side sectional view schematically showing the structure of the beam splitter 122L.

The beam splitter 122L includes a substrate 1221 and a half-mirror film 1222. The substrate 1221 is a transparent substrate that transmits light. For example, the substrate 1221 is a glass or resin substrate. The half-mirror film 1222 is a thin film formed on the combiner 121L side of the substrate 1221. The half-mirror film 1222 transmits part of incident light. The transmittance of the half-mirror film 1222 changes according to the film thickness. The transmittance of the half-mirror film 1222 decreases as the film thickness increases. For example, the film thickness and the transmittance are inversely proportional.

As shown in FIG. 4, the lower side (−Y side) of the half-mirror film 1222 becomes thinner. The film thickness of the half-mirror film 1222 becomes thinner as the half-mirror film 1222 is separated away from the left eye EL in the Z direction. This can reduce the luminance difference of a virtual image caused by the difference in the incident angle. The display quality of the head-mounted display 100 can be thereby improved.

Specifically, the film thickness at the first position Y1 is thicker than the film thickness at the second position Y2. The transmittance of the beam splitter 122L in the direction from the first position Y1 toward the left eye EL is equal to the transmittance of the beam splitter 122L in the direction from the second position Y2 toward the left eye EL. In other words, when light traveling parallel to the Z direction enters the beam splitter 122L, the transmittance at the first position Y1 is lower than the transmittance at the second position Y2.

As described above, the beam splitter 122L includes the half-mirror film 1222 whose transmittance changes according to the thickness. The thickness of the half-mirror film 1222 gradually decreases from the upper side to the lower side. This makes the transmittance of the beam splitter 122L in the direction from the first position Y1 toward the left eye EL equal to the transmittance of the beam splitter 122L in the direction from the second position Y2 toward the left eye EL. Therefore, the luminance difference of a virtual image in the vertical direction can be reduced. The display quality of the head-mounted display 100 can be thereby improved.

For example, a vapor deposition film can be used as the half-mirror film 1222. The half-mirror film 1222 is a wedge coat that is obliquely vapor-deposited with different film thicknesses in the plane of the substrate 1221. The half-mirror film 1222 is vapor-deposited on the substrate 1221 with the substrate 1221 inclined with respect to the deposition source. In other words, by arranging the substrate 1221 at an angle with respect to the deposition source, the distance from the deposition source to one end of the substrate 1221 is longer than the distance from the deposition source to the other end of the substrate 1221. This allows the vapor deposition film to be formed in such a manner that the thickness of the half-mirror film 1222 gradually becomes thicker from one end of the substrate 1221 to the other end of the substrate 1221. In FIG. 4, the thickness of the half-mirror film 1222 changes continuously, but the thickness of the half-mirror film 1222 may change in steps. For example, the half-mirror film 1222 may be formed in two or more different film thicknesses. The half-mirror film 1222 may be a single-layer film or a multilayer laminate film.

Figure 5:
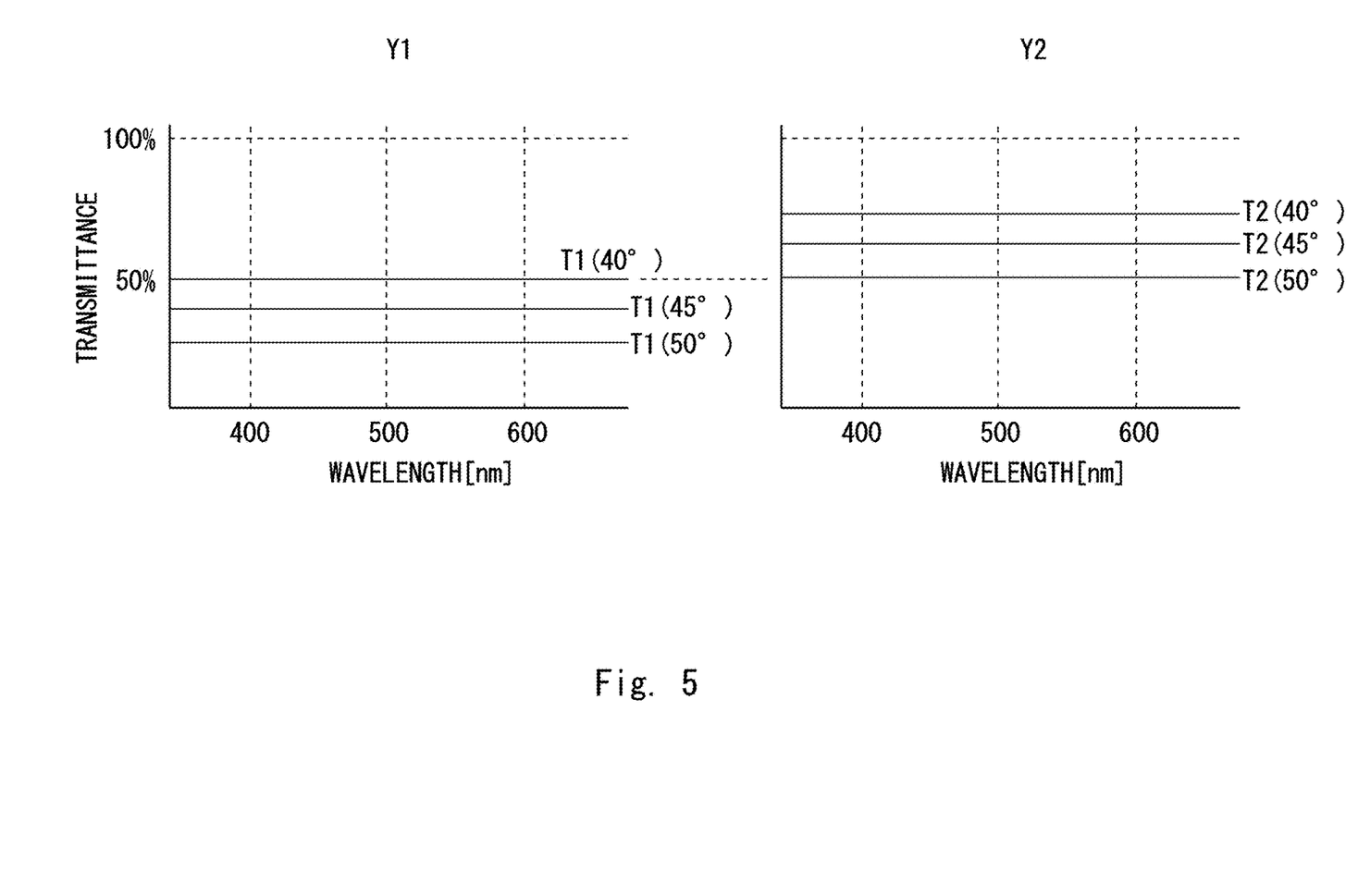
FIG. 5 is a graph for describing the transmittance of the beam splitter at a first position and a second position.

FIG. 5 is a graph showing the transmittance characteristics of light at the first position Y1 and the second position Y2. In FIG. 5, the horizontal axis is the wavelength of light, and the vertical axis is the transmittance. FIG. 5 shows the transmittance at the incident angles of 40°, 45°, and 50°. The transmittance at the first position Y1 is T1, and the transmittance at the second position Y2 is T2. For example, the transmittance T1 when the incident angle θ1 is 40° is shown as T1 (40°).

As shown in FIG. 5, the beam splitter 122L has a transmittance distribution in which T1 (40°) is equal to T2 (50°). Specifically, in FIG. 4, the display light PL12 at the first position Y1 is inclined by −5° with respect to the Z-axis, and the display light PL12 at the second position Y2 is inclined by +5° with respect to the Z-axis. In such a case, the film thickness distribution of the half-mirror film 1222 is adjusted in such a manner that the beam splitter 122L has a transmittance distribution in which T1 (40°) is equal to T2 (50°). The transmittance of light traveling in the direction inclined by −5° from the Z direction at the first position Y1 is equal to the transmittance of light traveling in the direction inclined by +5° from the Z direction at the second position Y2.

In other words, the half-mirror film 1222 has a film thickness distribution in which T1 is lower than T2 when the incident angle is the same. For example, T1 (45°) is smaller than T2 (45°). This can reduce the luminance difference in the vertical direction, thereby improving the display quality.

Second Embodiment

Figure 6:
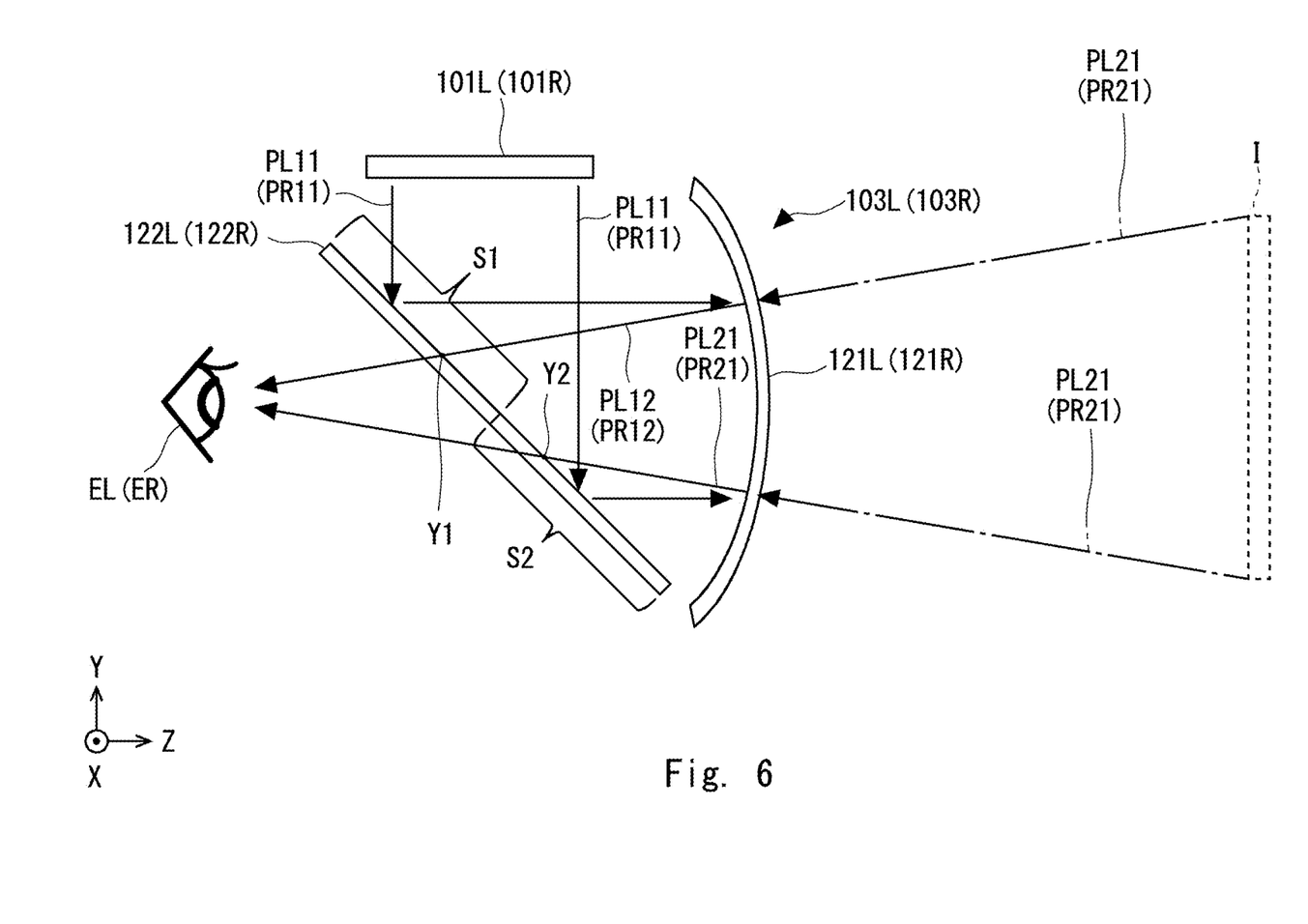
FIG. 6 is a view for describing an optical system of a head-mounted display according to a second embodiment.
Figure 7:
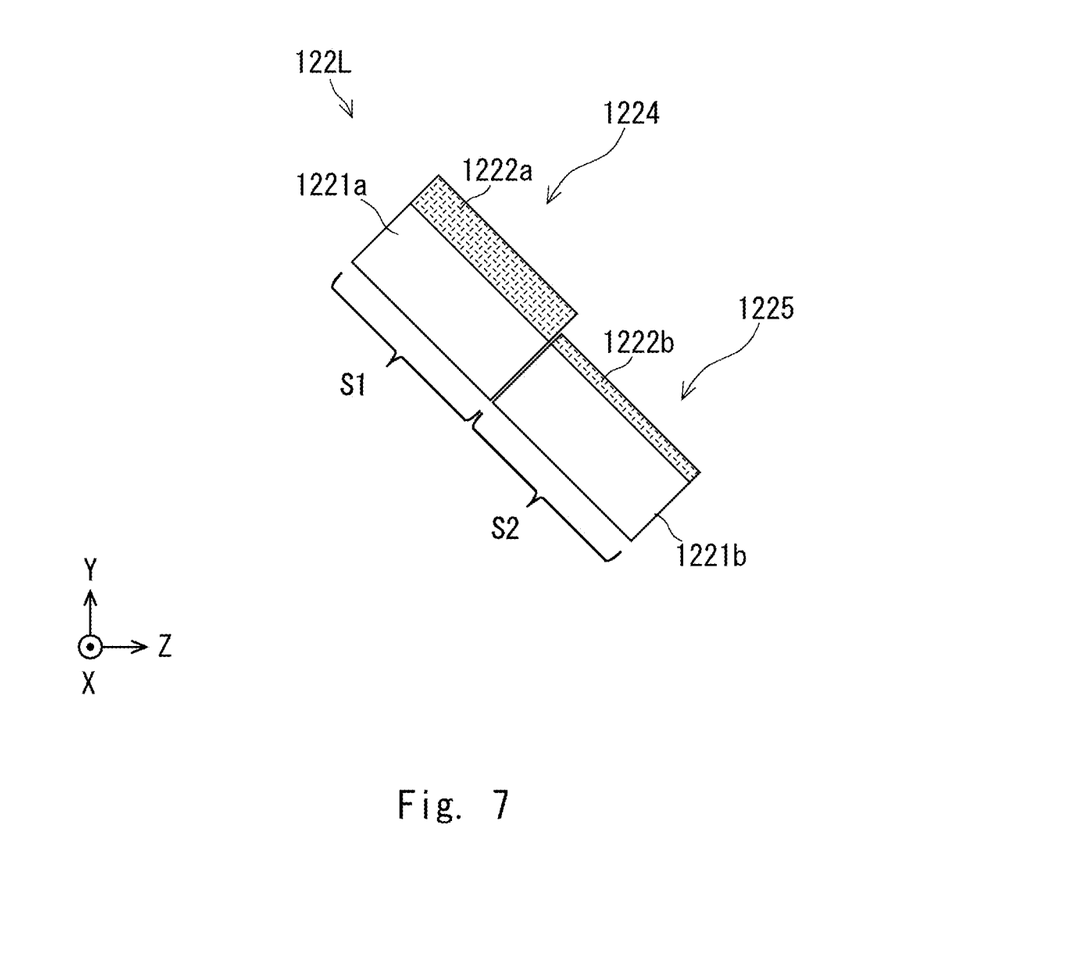
FIG. 7 is a view schematically showing the structure of a beam splitter of the head-mounted display according to the second embodiment.

In a second embodiment, the structure of the beam splitters 122L and 122R is different from that in the first embodiment. FIG. 6 is a diagram schematically showing the optical system of the head-mounted display. FIG. 7 is a side sectional view schematically showing the structure of the beam splitter 122L. The structure except the beam splitters 122L and 122R is the same as that in the first embodiment, and the description thereof is thus omitted. In addition, the beam splitter 122R is the same as the beam splitter 122L, and the description thereof is omitted as appropriate.

As shown in FIG. 6, the beam splitter 122L is divided into a first region S1 and a second region S2. The first region S1 is a region including the first position Y1. The second region S2 is a region including the second position Y2. As shown in FIG. 6, the upper half of the beam splitter 122L is the first region S1, and the lower half is the second region S2. The second region S2 is on the forward side of the first region S1.

As shown in FIG. 7, the beam splitter 122L is divided into the first region S1 and the second region S2. Specifically, the beam splitter 122L in the first region S1 is referred to as an upper beam splitter 1224, and the beam splitter 122L in the second region S2 is referred to as a lower beam splitter 1225. Thus, the beam splitter 122L includes the upper beam splitter 1224 and the lower beam splitter 1225.

The upper beam splitter 1224 includes a substrate 1221a and a half-mirror film 1222a. The lower beam splitter 1225 includes a substrate 1221b and a half-mirror film 1222b. The substrate 1221a and the substrate 1221b are transparent substrates or the like and have the same thickness.

The half-mirror films 1222a and 1222b are formed on the combiner 121L side of the substrates 1221a and 1221b. The half-mirror films 1222a and 1222b are thin films whose light transmittance changes according to the film thickness. The transmittance of the half-mirror films 1222 decreases as the film thickness increases. For example, the film thickness and the transmittance are inversely proportional. The half-mirror film 1222a and the half-mirror film 1222b are thin films made of the same material. The half-mirror films 1222a and 1222b may be single-layer films or multilayer laminate films.

The half-mirror film 1222a and the half-mirror film 1222b have different thicknesses. The half-mirror film 1222a is formed to be thicker than the half-mirror film 1222b. For example, the upper beam splitter 1224 is formed by forming a thin film that is the half-mirror film 1222a on the substrate 1221a. The lower beam splitter 1225 is formed by forming a thin film that is the half-mirror film 1222b on the substrate 1221b.

This makes the transmittance of the upper beam splitter 1224 in the direction from the first position Y1 toward the left eye EL equal to the transmittance of the lower beam splitter 1225 in the direction from the second position Y2 toward the left eye EL. Therefore, the luminance difference of a virtual image I in the vertical direction can be reduced. The display quality of the head-mounted display 100 can be thereby improved. Note that the dividing line between the upper beam splitter 1224 and the lower beam splitter 1225 is blurred and not visible because it is located near the left eye EL. Therefore, the user is not easily affected by the degradation of display quality due to the dividing line.

Third Embodiment

Figure 8:
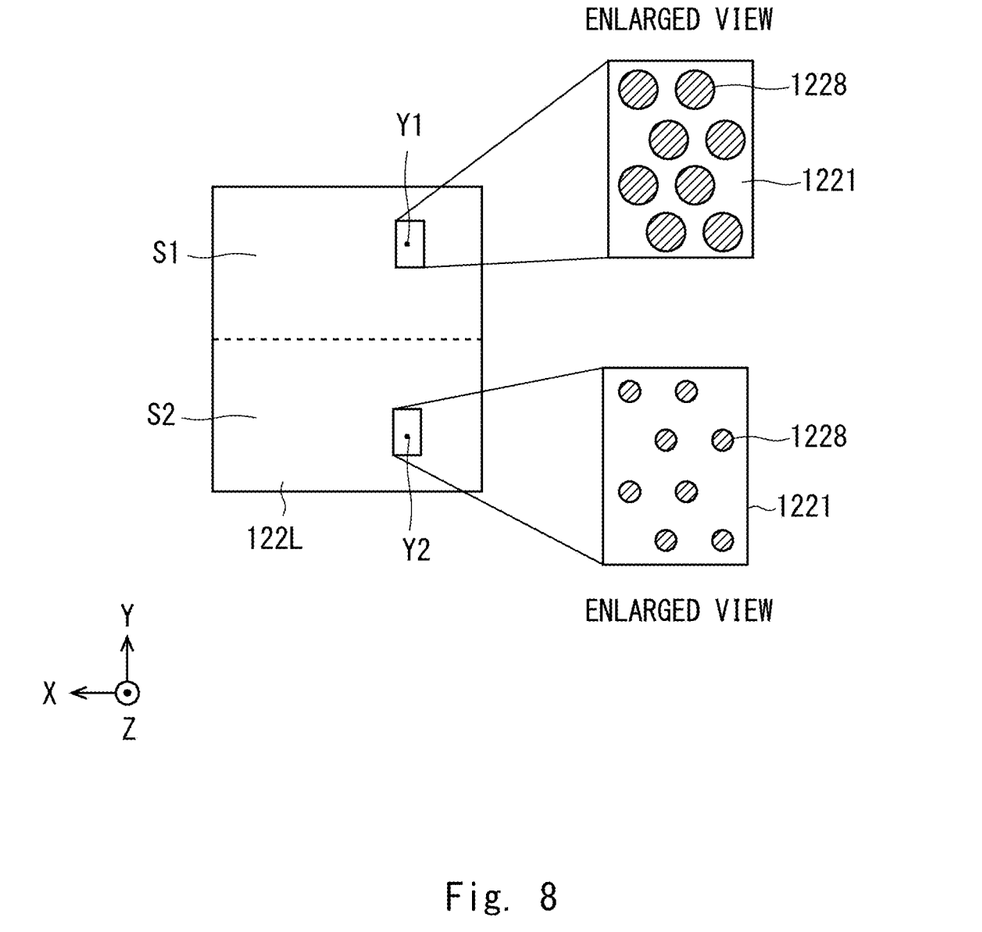
FIG. 8 is a schematic diagram showing the structure of a beam splitter of a head-mounted display according to a third embodiment.

The structure of the head-mounted display according to a third embodiment is described with reference to FIG. 8. FIG. 8 is a front view schematically showing the structure of the beam splitter 122L of the head-mounted display. The structure except the beam splitters 122L and 122R is the same as those in the first and second embodiments, and the description thereof is thus omitted. In addition, the beam splitter 122R is the same as the beam splitter 122L, and the description thereof is omitted.

In the third embodiment, the beam splitter 122L is, for example, a polka-dot beam splitter. Specifically, the beam splitter 122L includes a substrate 1221 and a reflective film pattern 1228. The substrate 1221 is a transparent substrate. The fine reflective film pattern 1228 is formed on the substrate 1221. The reflective film pattern 1228 is formed by coating the substrate 1221 with a metallic film, such as aluminum.

Therefore, light incident on a position where the reflective film pattern 1228 is formed is reflected by the beam splitter 122L. Light incident on a position where the pattern 1228 is not formed passes through the beam splitter 122L. At positions where the pattern 1228 is not formed, light passes through the transparent substrate 1221. The reflectance can be adjusted by adjusting the area occupancy of the pattern 1228, that is, the aperture ratio. The area occupancy is the percentage occupied by the reflective film pattern 1228 per unit area. By increasing the percentage occupied by the pattern 1228, the transmittance can be lowered. By decreasing the percentage occupied by the pattern 1228, the transmittance can be increased.

The reflective film pattern 1228 is located near the left eye EL and is so small that it is not visible to the user. The pattern 1228 is such a fine pattern that the user is not able to see it with the naked eye. Therefore, the user does not see the pattern 1228 in the virtual image. The pattern 1228 has a plurality of circular dots. In other words, the reflective film pattern 1228 is formed as a multiple dot pattern. The pattern 1228 may be a shape other than the circular shape. The reflective film pattern 1228 may be a single-layer film or a multilayer laminate film.

The first region S1 including the first position Y1 is located above the left eye of the user. The second region S2 including the second position Y2 is located below the left eye of the user. The area occupancy of the pattern 1228 in the first region S1 is different from that in the second region S2.

Specifically, the area occupancy of the pattern 1228 in the first region S1 is larger than the area occupancy of the pattern 1228 in the second region S2. This makes the transmittance of the first region S1 smaller than the transmittance of the second region S2 when the incident angle is the same. In other words, when the incident angle is the same, more light is reflected in the first region S1 than in the second region S2. The transmittance of the beam splitter 122L in the direction from the first position Y1 toward the left eye EL is equal to the transmittance of the beam splitter 122L in the direction from the second position Y2 toward the left eye EL. The luminance difference in the vertical direction can be reduced, and the display quality of the head-mounted display 100 can be thereby improved.

In FIG. 8, the size of the pattern 1228 in the first region S1 is larger than that of the pattern 1228 in the second region S2. In other words, the dot size of the pattern 1228 in the first region S1 is larger than the dot size of the pattern 1228 in the second region S2. The pitch of the pattern 1228 is the same in the first region S1 and the second region S2. This allows the transmittance in the direction toward the left eye EL to be equal at each position.

Obviously, the pattern 1228 in the first region S1 and the pattern 1228 in the second region S2 may be the same size. In this case, the pattern 1228 in the first region S1 and the pattern 1228 in the second region S2 are formed at different pitches. In other words, the area occupancy can be changed by changing at least one of the size, pitch, shape, number, and the like. By providing an in-plane distribution in the pattern 1228, the transmittance can be equal at each position. This can reduce luminance unevenness in the vertical direction, thereby improving the display quality. In addition, the regions with different transmittance in the beam splitter 122L may be further subdivided in such a manner that the transmittance in the direction from one point in each region toward the left eye EL is equal.

Fourth Embodiment

Figure 9:
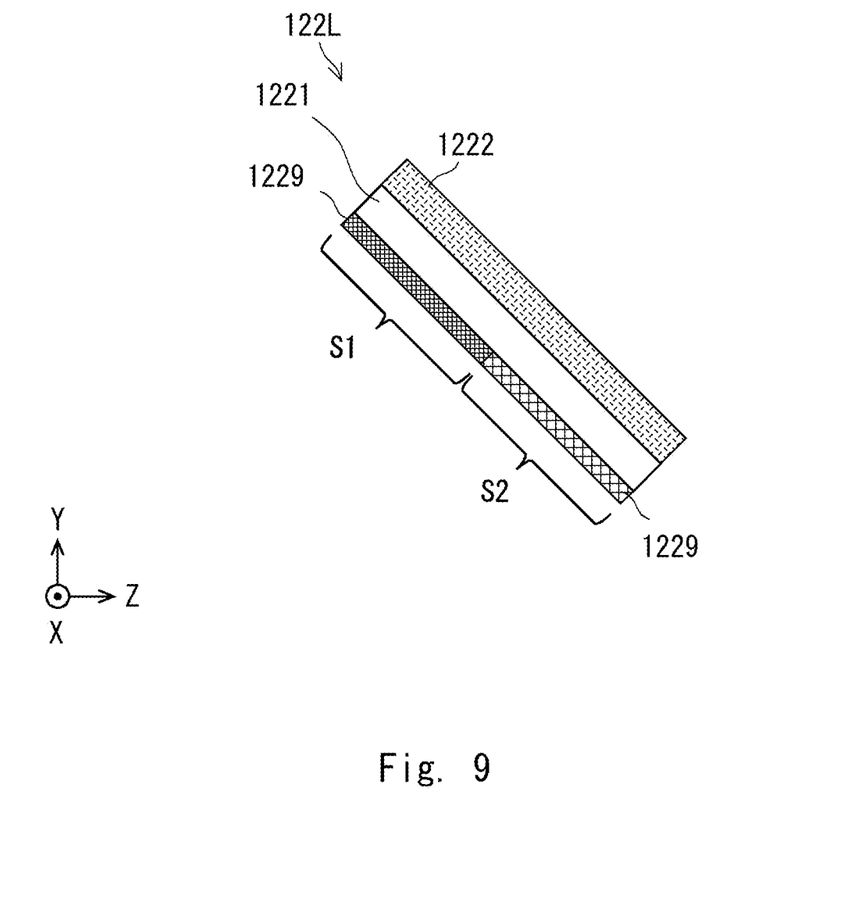
FIG. 9 is a view schematically showing the structure of a beam splitter of a head-mounted display according to a fourth embodiment.

The head-mounted display 100 according to a fourth embodiment is described with reference to FIG. 9. FIG. 9 is a side view schematically showing the structure of the beam splitter 122L of the head-mounted display 100. The structure except the beam splitter 122L is the same as those in the first to third embodiments, and the description thereof is thus omitted. For example, the beam splitter 122L is divided into the first region S1 and the second region S2, as shown in FIG. 9. The first region S1 is a region including the first position Y1 above the left eye, and the second region S2 is a region including the second position Y2 below the left eye EL.

The beam splitter 122L includes a substrate 1221, a half-mirror film 1222, and a light absorption filter 1229. The half-mirror film 1222 is formed on the combiner 121L side of the substrate 1221. The light absorption filter 1229 is formed on the left eye EL side of the substrate 1221. In other words, from the rear, the light absorption filter 1229, the substrate 1221, and the half-mirror film 1222 are arranged in this order. The light absorption filter 1229 absorbs part of light and transmits the remaining light.

The half-mirror film 1222 is formed with a uniform thickness over the entire plane. Therefore, the reflectance and transmittance of the half-mirror film 1222 are uniform within the plane. On the other hand, the absorptivity of the light absorption filter 1229 is not uniform in the plane. The absorptivity of the light absorption filter 1229 in the first region S1 is different from that in the second region S2. The absorptivity of the light absorption filter 1229 in the first region S1 is higher than the absorptivity of the light absorption filter 1229 in the second region S2.

Therefore, the transmittance of the beam splitter 122L in the direction from the first position Y1 toward the left eye EL is equal to the transmittance of the beam splitter 122L in the direction from the second position Y2 toward the left eye EL. The luminance difference in the vertical direction can be reduced. By attaching the light absorption filter 1229 to the substrate 1221, the display quality can be improved.

The absorptivity of the light absorption filter 1229 can be adjusted by the concentration of a light absorbing material in the transparent material. For example, as the concentration of the light absorbing material increases, the absorptivity increases. The concentration of the light absorbing material is higher in the first region S1, and the concentration of the light absorbing material is lower in the second region S2. In this manner, by making the concentration of the light-absorbing material in the first region S1 higher than the concentration in the second region S2, luminance unevenness in the vertical direction can be improved. Note that the light absorption filter 1229 in the first region S1 and the light absorption filter 1229 in the second region S2 may be formed integrally or separately.

Although the head-mounted display 100 has been described as an optical see-through head-mounted display, the head-mounted display 100 may be a non-transmissive head-mounted display. In the case of a non-transmissive head-mounted display, reflective mirrors are provided instead of the combiners 121L and 121R. In other words, the reflective member arranged in front of the beam splitter 122 may be a beam splitter, such as a half mirror, or a reflective mirror. The reflective member reflects display light in the direction toward the user.

Two or more of the above-described embodiments may be combined as appropriate.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A head-mounted display comprising:
a reflective member arranged in front of a user and configured to reflect at least part of display light for forming a display image toward the user; and
a beam splitter arranged between the reflective member and an eye of the user and configured to reflect the display light toward the reflective member and to transmit the display light that has been reflected by the reflective member,
wherein transmittance of the beam splitter in a direction from a first position above the eye of the user toward the eye is equal to transmittance of the beam splitter in a direction from a second position below the eye of the user toward the eye,
wherein the beam splitter is formed with a fine pattern of a reflective film configured to reflect light, and
wherein area occupancy of the fine pattern in a first region including the first position is different from area occupancy of the fine pattern in a second region including the second position.

2. The head-mounted display according to claim 1, wherein the area occupancy of the fine pattern in the first region is larger than the area occupancy of the fine pattern in the second region.

3. The head-mounted display according to claim 1, wherein the fine pattern is formed as a multiple dot pattern including a plurality of dots, and
wherein the area occupancy is changed by changing at least one of size, pitch, shape, and number of the dots.

4. The head-mounted display according to claim 1, wherein the beam splitter is divided into more than two regions in such manner that the transmittance in the direction from one point in each region toward the eye is equal to each other.

* * * * *